(12) United States Patent
Wang et al.

(10) Patent No.: US 10,227,941 B2
(45) Date of Patent: Mar. 12, 2019

(54) VEHICLE EXHAUST AFTERTREATMENT SYSTEMS AND METHODS

(71) Applicant: GM GLOBAL TECHNOLOGY OPERATIONS LLC, Detroit, MI (US)

(72) Inventors: Yue-Yun Wang, Troy, MI (US); Venkata Prasad Atluri, Novi, MI (US); Suresh Gopalakrishnan, Troy, MI (US); Alberto Lorenzo Vassallo, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 92 days.

(21) Appl. No.: 15/583,296

(22) Filed: May 1, 2017

(65) Prior Publication Data

US 2018/0313283 A1 Nov. 1, 2018

(51) Int. Cl.
*F02D 41/02* (2006.01)
*F02D 41/30* (2006.01)
(Continued)

(52) U.S. Cl.
CPC ........... *F02D 41/029* (2013.01); *F01N 3/021* (2013.01); *F01N 3/0842* (2013.01); *F01N 3/103* (2013.01);
(Continued)

(58) Field of Classification Search
CPC .. F02D 41/029; F02D 41/405; F02D 41/3005; F02D 41/0275; F01N 3/021;
(Continued)

(56) References Cited

U.S. PATENT DOCUMENTS 6,988,361 B2    1/2006  van Nieuwstadt et al.
7,621,120 B2   11/2009  Matheaus et al.
(Continued)

FOREIGN PATENT DOCUMENTS

GB          2500923 A        10/2013

OTHER PUBLICATIONS

W. Addy Majewski, "Diesel Filter Regeneration", https://www.dieselnet.com/tech/dpf_regen.php#no2 extracted on Mar. 13, 2017; 19 pages.

(Continued)

*Primary Examiner* — Mark Laurenzi
*Assistant Examiner* — Dapinder Singh
(74) *Attorney, Agent, or Firm* — Quinn IP Law (57) ABSTRACT

A vehicle propulsion system includes an internal combustion engine configured to output a primary output torque and at least one fuel injector arranged to supply fuel to a combustion chamber of the engine. The propulsion system also includes at least one exhaust aftertreatment device to capture combustion byproducts within an exhaust flow. The propulsion system also includes an electric machine coupled to the engine to exchange torque. A controller is programmed to supply a baseline fuel injection corresponding to a first engine output to satisfy a driver torque demand and to periodically supplement the baseline target fuel injection quantity to increase engine output torque to overshoot the first engine output thereby increasing combustion byproducts to regenerate the at least one exhaust aftertreatment device. The controller is also programmed to apply a resistive torque from the electric machine such that an overall propulsion system torque remains at the driver torque demand.

19 Claims, 6 Drawing Sheets

(51) Int. Cl.
*F02D 41/40* (2006.01)
*F01N 3/02* (2006.01)
*F01N 3/08* (2006.01)
*F01N 3/10* (2006.01)
*F01N 3/021* (2006.01)

(52) U.S. Cl.
CPC ..... *F02D 41/0275* (2013.01); *F02D 41/3005* (2013.01); *F02D 41/405* (2013.01)

(58) Field of Classification Search
CPC ... F01N 3/10; F01N 3/36; F01N 3/103; F01N 3/0842; F01N 11/002; F01N 11/007; F01N 2250/02; F01N 2430/06; F01N 2560/025; F01N 2560/06; F01N 2900/08; F01N 2900/1402; F01N 2900/1602; F01N 2900/1606; F01N 2900/1614; F01N 2900/1626
USPC ......... 60/274, 285, 286, 295, 297, 301, 311, 60/608
See application file for complete search history.

(56) References Cited

U.S. PATENT DOCUMENTS

| 8,001,771 | B2 | 8/2011 | Sheidler et al. | |
| 2003/0106308 | A1* | 6/2003 | Gabe | F01N 3/0222 60/295 |
| 2003/0160455 | A1* | 8/2003 | Hu | B60K 6/48 290/40 C |
| 2006/0218903 | A1* | 10/2006 | Ogata | B60K 6/48 60/295 |
| 2007/0204594 | A1* | 9/2007 | Ishii | B60K 6/48 60/274 |

OTHER PUBLICATIONS

W. Addy Majewski, "Diesel Oxidation Catalyst", https://www.dieselnet.com/tech/cat_doc.php extracted on Mar. 13, 2017; 28 pages.

W. Addy Majewski, "NOx Adsorbers", https://www.dieselnet.com/tech/cat_noxtrap.php extracted on Mar. 13, 2017; 33 pages.

\* cited by examiner

VEHICLE EXHAUST AFTERTREATMENT SYSTEMS AND METHODS

TECHNICAL FIELD

The present disclosure relates to control of propulsion systems to influence exhaust conditions.

INTRODUCTION

A hybrid powertrain includes a combustion engine as a propulsion source, and at least one electric machine which may be selectively operated to supplement propulsion torque or apply a resistive load to engine output to generate electricity from the mechanical rotation. Each of the devices may be operated in cooperation to optimize fuel consumption, performance, driver comfort or other attributes.

SUMMARY

A vehicle propulsion system includes a diesel internal combustion engine configured to output a primary output torque and at least one fuel injector arranged to supply fuel to a combustion chamber of the engine. The propulsion system also includes at least one exhaust aftertreatment device to capture combustion byproducts within an exhaust flow. The propulsion system also includes an electric machine coupled to the engine to exchange torque. The propulsion system further includes a controller programmed to supply a baseline fuel injection corresponding to a first engine output to satisfy a driver torque demand and to periodically supplement the baseline target fuel injection quantity to increase engine output torque to overshoot the first engine output thereby increasing combustion byproducts to regenerate the at least one exhaust aftertreatment device. The controller is also programmed to apply a resistive torque from the electric machine such that an overall propulsion system torque is maintained substantially at the driver torque demand.

A method of regenerating at least one exhaust aftertreatment device of a propulsion system having an engine and an electric machine includes supplying a baseline fuel injection corresponding to a first engine output corresponding to a driver torque demand. The method also includes increasing the baseline fuel injection to cause a second engine output in excess of the first engine output, and applying a resistive torque from the electric machine such that an overall propulsion system output is maintained substantially at the driver torque demand. The method further includes comparing a measured air-fuel ratio to a regeneration desired air-fuel ratio, and supplying a post-combustion fuel injection based on an error from the desired air-fuel ratio to cause a third engine output. At least one of the second engine output and the third engine output is arranged to cause regeneration of the at least one aftertreatment device.

A vehicle propulsion system includes an internal combustion engine configured to output a primary output torque and at least one fuel injector arranged to supply fuel to a combustion chamber of the engine. The propulsion system also includes at least one exhaust aftertreatment device to capture combustion byproducts within an exhaust flow. The propulsion system also includes an electric machine coupled to the engine to exchange torque. The propulsion system further includes a controller programmed to supply a baseline fuel injection corresponding to a first engine output to satisfy a driver torque demand, and periodically increase the baseline target fuel injection quantity to increase engine output torque to a second engine output thereby increasing combustion byproducts to regenerate the at least one exhaust aftertreatment device. The controller is also programmed to apply a resistive torque from the electric machine based on at least one of an electric machine maximum generator power limit and a battery charge relative to a state of charge threshold. The controller is further programmed to supply a post-combustion fuel injection into the exhaust in response to an exhaust air-fuel ratio corresponding to the second engine output being greater than a target ratio.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
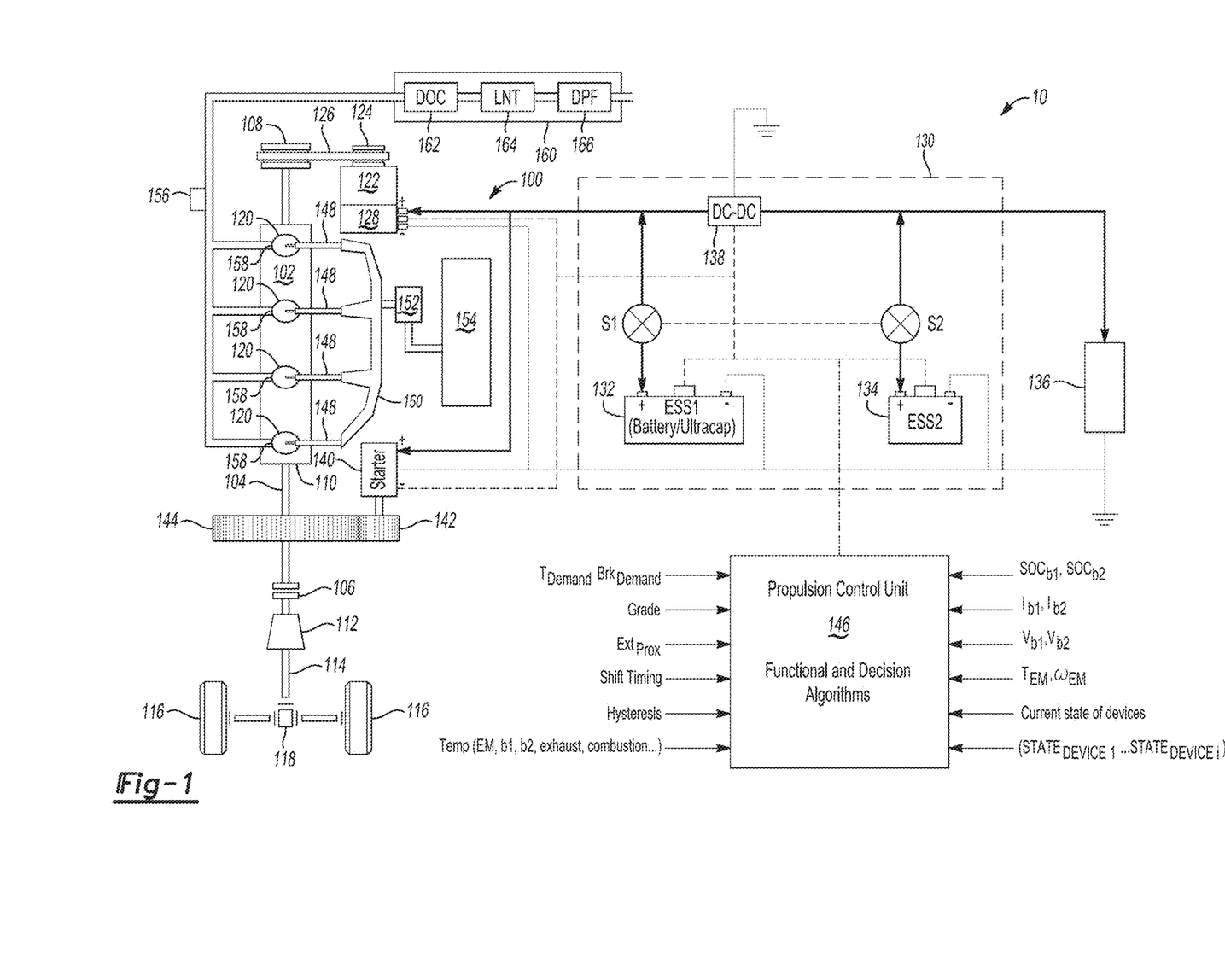
FIG. 1 is a system diagram of a vehicle propulsion system.

Referring to FIG. 1, vehicle 10 includes propulsion system 100 having multiple propulsion sources to provide motive power. In various examples, the propulsion system includes internal combustion engine 102 to generate torque at shaft 104 which may be coupled to a crankshaft of the engine. The engine 102 may be a multi-cylinder internal combustion engine that converts fuel to a mechanical torque through a thermodynamic process. Shaft 104 is coupled to an input of a transmission 112 which is configured to provide multiple gear ratios to modify torque and rotational speed to affect drive characteristics. The output of the transmission 112 is then delivered to a final drive output shaft 114 to deliver torque to one or more road wheels 116. The propulsion system may also include a final drive mechanism 118 configured to allocate torque to multiple road wheels 116 from a single torque input. In one example the final drive mechanism 118 is a differential configured to distribute torque to one or more side shafts which are coupled to road wheels 116. The propulsion system may be arranged to deliver torque through any of a front-wheel drive, a rear-wheel drive, or an all-wheel drive configuration.

The engine 102 may be selectively coupled and decoupled from the propulsion system. One or more selectable disconnect elements may be located at various positions along the torque flow path. For example, a clutch 106 may be provided to selectively engage or disengage the torque output of the engine 102 based on the desired operating mode of the propulsion system 100. In an alternative example, a clutch may be included as a lockup portion of the fluid coupling torque converter. Additionally, any of the one or more clutches described herein may be a selectable state one-way clutch configured to passively engage, for example during overrun conditions, and actively engage to transfer torque in a single direction. Other types of torque transfer mechanisms may be suitable to connect and/or disconnect the engine from the driveline. Discussed in more detail below, the disengaged state of the engine 102 facilitates inactive engine operation modes to enhance fuel efficiency. As used herein, an inactive state of the engine refers to a condition where the engine has substantially zero output torque and zero speed. In contrast, an active state refers to a condition when the engine is operating to drive the output shaft 104.

The engine 102 includes an engine block 110 having a number of combustion chambers 120. A fuel and air mixture (not shown) is provided to each combustion chamber 120 and ignited, resulting in hot expanding exhaust gases causing reciprocal movement of a piston within the combustion chamber 120. The fuel is provided through at least one fuel injector 148 and mixed with air provided to each combustion chamber 120. The fuel is provided at high pressure to each fuel injector from a fuel rail 150 in fluid communication with a high pressure fuel pump 152 that increases the pressure of fuel received from a fuel source 154.

An exhaust manifold 156 directs exhaust gases from exhaust ports 158 which are in fluid connection with the combustion chambers 120. The gases are directed through an exhaust aftertreatment system 160. An aftertreatment system 160 is provided which may include a number of aftertreatment devices disposed along the exhaust flow to address various combustion byproducts. The vehicle 10 may contain a number of aftertreatment devices which can be arranged in a variety of configurations. The devices may be located separately along the exhaust flow path, or integrated into a single modular unit. Element 160 of FIG. 1 refers to any combination of aftertreatment devices, i.e., in any number of each, any order, and disposed in multiple paths. In the example of FIG. 1, engine 102 is a diesel engine, and is fitted with each of a diesel oxidation catalyst (DOC) 162, a lean $NO_x$ trap (LNT) 164, and a diesel particulate filter (DPF) 166 are serially arranged along an exhaust duct. As discussed in more detail below, the devices within the aftertreatment system 160 may require periodic regeneration to release trapped exhaust byproduct particles in order to recondition the devices.

The propulsion system 100 also includes a second propulsion source such as a traction electric machine 122. The electric machine is powered by an electrical storage system such as a battery or an ultra-capacitor. The traction electric machine 122 is arranged to operate in multiple operating modes depending on the direction of power flow. The traction electric machine is configured to operate as a motor and convert stored electric energy from a battery to mechanical power. The electric machine 122 is also configured to operate as a generator in a reverse power flow direction to convert mechanical energy into electrical energy to be stored at the battery. For example, the traction electric machine 122 may operate as a traction motor to output torque, operate as a generator to recover energy from rotational motion in the driveline, and also operate in a power-neutral freewheeling state. In some examples, the traction electric machine 122 exchanges power with a high-voltage battery 132 over a high-voltage bus. Additionally, the traction electric machine 122 is configured as an "off-axis" motor-generator, meaning its axis of rotation is separate from the axis of rotation of the input shaft 104 of the transmission. A wider range of torque ratios may be available, and a smaller electric machine may be sufficient to satisfy propulsion demands. Additionally, the traction electric machine may be capable of high speeds of at least two to three times the engine output speed. In alternate examples, the traction electric machine 122 may be arranged to be "on-axis" such that the axis of rotation of the electric machine is common to the axis of rotation of the transmission input shaft.

In traction motor mode, a power conversion portion 128 of the electric machine 122 operates as an inverter to convert DC power received from one or more energy storage systems into a three-phase AC power to operate the electric machine. In one example, DC power is delivered from a high-voltage battery 132 allowing the traction electric machine 122 to output torque to motor torque interface 124. The power conversion portion also includes a pulse width modulation (PWM) control of one or more internal switches to convert the DC power into AC power in order to generate an electromagnetic field to drive the electric machine. The motor torque interface 124 is coupled to a driveline torque interface 108 via a torque coupling 126. The torque coupling 126 may include a belt to transfer torque between the traction electric machine 122 and other portions of the driveline. In this case, motor torque interface 124 and driveline torque interface 108 may each be provided as pulleys arranged to cooperate with the torque coupling 126. IN the example of FIG. 1, the torque coupling 126 is a belt that may be a ribbed belt, a flat belt or any other configuration suitable to transfer torque. In other examples, the torque coupling 126 may be provided as a chain instead of a belt, and sprockets can be utilized with the chain as opposed of pulleys. In further examples, the driveline torque interface 108, motor torque interface 124, and the torque coupling 126 may include a plurality of gears to transfer torque from the traction electric machine 122 to the driveline for vehicle propulsion. The traction electric machine may be coupled or connected at various locations along the driveline relative to the torque flow of the propulsion system. The traction electric machine 122 may be disposed either upstream of the transmission 112, downstream of the transmission 112, or integrated within a housing of the transmission 112. In alternative examples, the traction electric machine is integrated into the rear differential of a rear wheel drive configuration.

In generator mode, the direction of torque flow through the torque coupling 126 is reversed and rotational motion in the driveline is used to turn the motor torque interface 124 to generate three phase alternating current. The power conversion portion 128 functions as a power rectifier to convert AC current generated by the traction electric machine 122 into DC current to be received at the high-voltage battery 132. The generated current may be used to recharge the high-voltage battery 132 or supply vehicle electrical loads directly.

The high-voltage battery 132 also includes a plurality of sensors to output signals indicative of battery conditions, including but not limited to battery temperature, current transfer at the battery, and battery voltage. Generally, a high-voltage power source is one that has an operating voltage greater than 30 volts but less than 60 volts. In one example, the battery 132 is a lithium ion high-voltage battery with a nominal voltage of about 48 volts. In alternative examples, a 36 volt power source may be provided as the high-voltage power source. Further, other energy storage types may be viable to provide power to the propulsion system as well as other vehicle loads, such as lead acid batteries, super capacitors, or other types of energy storage devices.

A low voltage energy storage device, such as battery 134 supplies power to vehicle loads 136 over a low-voltage bus. Loads 136 may include vehicle accessories and other loads with relatively low electrical demand. For example, the low-voltage battery may have a nominal voltage of about 12 volts and generally less than 18 volts.

The vehicle 10 also includes switching elements S1 and S2 to regulate power flow across the high and low voltage portions of the electrical system. More specifically, the switches S1 and S2 allow power from either or both of the high-voltage battery 132 and low-voltage battery 134. In this way, the switches may be used to effectively switch voltage in the circuit with operating the DC-DC converter 138. In other examples, power flow may be redirected to be supplied from one energy storage supply if there is a fault condition with the other of the energy storage supply. According to a specific case, power from the high-voltage battery may be used to supply low voltage loads in the event of a fault condition with the low-voltage battery. Thus portions of the circuit may be isolated or redirected as needed for vehicle function.

A unidirectional or bidirectional DC-DC converter 138 exchanges power between high and low voltage electrical buses. The DC-DC converter 138 may be part of an accessory power control module (APM) and include an internal unidirectional blocking switch or a bidirectional blocking switch. In one configuration, the DC-DC converter 138 includes at least one solid-state switch. The DC-DC converter 138 is configured to allow continuous or selective electrical communication between the high-voltage bus and the low-voltage bus. Therefore, the DC-DC converter 138 can be utilized to ensure that the desired amount of current, within a predetermined voltage range, is delivered to low-voltage loads 136 to power various accessories which can include powering all or some of the accessories of the vehicle 10. The DC-DC converter 138 can be utilized to provide substantially constant voltage to the low-voltage loads 136 if a voltage level of either power source differs from a desired nominal value. In one example, if the voltage level deviates to less than about 10 volts or more than about 16 volts relative to a 12 volt nominal value, the DC-DC converter 138 can regulate the voltage being delivered to the low-voltage load 136. Therefore, the DC-DC converter can increase or decrease the voltage being delivered to power vehicle accessories In another example the DC-DC converter is arranged to convert voltage from about 48 volts to about 12 volts, and vice versa. While the aforementioned voltage values are provided by way of example, it should be appreciated that the present disclosure may be related to power transitions between a range of voltage values for each of a high-voltage bus and a low-voltage bus.

The DC-DC converter 138 may be used in either direction of power exchange such that the high-voltage battery 132 may supply the low-voltage loads 136 without drawing power from the low-voltage battery 134. Additionally, the DC-DC converter 138 may be used to jump start the high-voltage battery 132 using power from the low-voltage battery 134.

In at least one example, each of the energy storage devices, including high-voltage battery 132 and low-voltage battery 134, is integrated into a single power module 130. Additionally, the DC-DC converter 138 may similarly be integrated into the power module 130. In some alternate examples, each of the energy storage devices may have substantially the same voltage. In further alternate examples, power may be provided by a single high-voltage energy storage devices. In such examples, a single battery may be jump-started from an external power source. The DC-DC converter may be used to step down the voltage to supply low voltage vehicle loads. Further still, certain alternate examples may include a third energy storage device, for example a redundant low-voltage power source.

Vehicle 10 includes a starter electric machine 140 that is selectively coupled to the engine 102. The starter electric machine 140 operates as a starter motor and when engaged with the engine leading up to a combustion cycle, and turns a crank portion of the engine to facilitate a cold start or a restart. The starter electric machine 140 may be selectively coupled to the engine through a geared mechanical connection to pass torque to the crankshaft to start the engine. In one example, a pinion gear 142 cooperates with a ring gear 144 to crank the engine for a start event. The ring gear 144 may be coupled to a flywheel of the engine 102. In another example, the starter electric machine 140 may be connected to a crank pulley through a toothed belt mechanical connection to pass torque to the crankshaft of the engine 102. According to some examples, a controller 146 is programmed to issue a command to start the engine 102 using the starter electric machine 140 in response to an acceleration demand following a period of reduced acceleration demand.

The starter electric machine 140 is selectively engageable to the engine 102 through a sliding pinion interface disposed within a housing of the starter electric machine. A starter actuator (not shown) may be disposed to move the pinion gear 142 between a first disengaged position and a second engaged position that is in mechanical connection with the ring gear 144 to transfer torque. As discussed above there may be different configurations of intermediate components to provide gear ratio adjustments and/or geometric adjustments due to powertrain package constraints. The starter actuator may receive a signal to engage the pinion gear once the starter electric machine is at a suitable speed for smooth torque transfer to start the engine 102.

According to aspects of the present disclosure, the starter electric machine 140 is a brushless permanent magnet DC motor selectively coupled to the engine 102 to provide a starting torque to restart the engine 102. The starter electric machine 140 is powered by the high-voltage traction battery 132 over the high-voltage bus. The high-voltage operation of the starter electric machine 140 provides faster engine restarts that enable quicker resumption of engine power delivery during an acceleration event following engine deactivation. For example, conditions including accelerator pedal tip-in causing a rapid torque demand following a coasting period where the engine was deactivated may benefit from aspects of present disclosure.

The various propulsion system components discussed herein may have one or more associated controllers to control and monitor operation. Controller 146, although schematically depicted as a single controller, may be implemented as one controller, or as system of controllers in cooperation to collectively manage the propulsion system. Communication between multiple controllers, and communication between controllers, actuators and/or sensors may be accomplished using a direct wired link, a networked communications bus link, a wireless link, a serial peripheral interface bus or any another suitable communications link. Communications includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers. In a specific example, multiple controllers communicate with one another via a serial bus (e.g., Controller Area Network (CAN)) or via discrete conductors. The controller 146 includes one or more digital computers each having a microprocessor or central processing unit (CPU), read only memory (ROM), random access memory (RAM), electrically-programmable read only memory (EPROM), a high speed clock, analog-to-digital (A/D) and digital-to-analog (D/A) circuitry, input/output circuitry and devices (I/O), as well as appropriate signal conditioning and buffering circuitry. The controller 146 may also store a number of algorithms or computer executable instructions needed to issue commands to perform actions according to the present disclosure.

The controller 146 is programmed to monitor and coordinate operation of the various propulsion system components. The controller 146 is in communication with the engine 102 and receives signals indicative of at least engine rotational speed, temperature, as well as other engine operating conditions. The controller 146 is also in communication with the traction electric machine 122 and receives signals indicative of motor speed, torque, temperature, current draw, and voltage across the motor. The controller may also be in communication with both of the high-voltage battery 132 and the low-voltage battery 134 and receive signals indicative of at least battery state of charge (SOC), temperature, voltage and current draw. SOC represents the remaining charge available in a battery and is characterized as a percentage of a full charge (i.e., 100%). The controller also receives signals indicative of the circuit voltage at various points across the high-voltage bus and the low-voltage bus. The controller 146 may further be in communication with one or more sensors at driver input pedals (not shown) to receive signals indicative of pedal position which may reflect both positive and negative acceleration demand provided by the driver. The driver input pedals may include an accelerator pedal and/or a brake pedal. In certain alternative examples, such as a self-driving autonomous vehicle, acceleration demand may be determined by a computer that is either on-board or off-board of the vehicle without driver interaction.

With specific reference to the example of FIG. 1, controller 146 receives several input signals and provides output signals related to operation of the propulsion system. In one example the controller 146 is configured to receive a plurality of input signals from the traction electric machine, such as of at least a traction electric machine torque signal, $\tau_{EM}$, a traction electric machine speed signal, $\omega_{EM}$, and a traction electric machine temperature signal $Temp_{EM}$. The controller 146 is further configured to receive input signals indicative of operating conditions of each of the high-voltage battery and low-voltage battery respectively, such as battery voltages $V_{b1}$ and $V_{b2}$, current $I_{b1}$ and $I_{b2}$, state of charge $SOC_{b1}$ and $SOC_{b2}$, and battery temperature $Temp_{b1}$ and $Temp_{b2}$. The controller is further configured to receive input signals indicative of various other vehicle operating conditions, such as propulsion system torque demand $\tau_{DEMAND}$, braking demand $Brk_{DEMAND}$, vehicle analytics such as sub-system state of health, external object proximity $Ext_{Prox}$, global positioning system location GPS, transmission gear state TransGear and shift timing, as well as the operational state of a plurality of different vehicle devices $STATE_{DEVICE\ 1}$ through $STATE_{DEVICE\ i}$. While several example inputs are described herein by way of example, it is contemplated that additional or different combinations of inputs may be suitable to influence operation of the propulsion system.

Based on the various input signals received by the controller, a processor is programmed to execute one or more algorithms to control operation of the propulsion system. An operating system is stored at the controller 146 to monitor and regulate operation of the components of the propulsion system. The operating system may include a propulsion mode selection algorithm to determine and implement the most suitable combination of propulsion sources based on the input conditions. More specifically, the controller monitors the battery, engine, motor, and exhaust systems to determine the best mode of operation at any given time based on the current states of respective components. In one example, the propulsion system periodically enters a regeneration mode to regenerate one or more of aftertreatment devices to enhance performance.

Byproducts from the diesel combustion process are passed through the exhaust system and processed by the aftertreatment system 160. These byproducts of combustion include various classes of exhaust compounds such as nitrogen oxide pollutants ($NO_x$). In direct-inject diesel engine exhaust, nitric oxide (NO) can be the most abundant variant, and constitutes a significant amount of the total $NO_x$ at engine-out conditions. Nitrogen dioxide ($NO_2$) may make up the balance of $NO_x$ emissions. Levels of $NO_2$ can be significantly increased by catalyzed aftertreatment devices that promote oxidation reactions. For the two important $NO_x$ compounds in diesel exhaust, NO forms as a byproduct of the combustion process and additional $NO_2$ may then be formed from the NO. The diesel engine generally burns lean, and power output is controlled by the amount of fuel injected into the cylinder. Since the diesel engine generally operates using lean combustion, there is always excess oxygen in the exhaust to aid in the formation of additional $NO_2$.

The DOC 162 converts NO portions of the exhaust flow into additional $NO_2$, then passes the $NO_2$ molecules to the LNT 164. The LNT 164 is a second catalytic device containing catalysts, such as rhodium, platinum, palladium, and adsorbents such as barium-based elements, which provide active sites suitable for binding the $NO_2$ within the exhaust gas to trap them within the device itself. The LNT 164 is arranged to periodically purge the $NO_2$ during an operation state where an excess amount of fuel is available, or rich operating conditions. The LNT 164 may be configured to operate cyclically, for example, when the engine is switched between lean-burn operation and rich operation to cause regeneration. When the engine is switched to rich operation, the $NO_2$ stored on adsorbent sites react with reductants in the exhaust gas and are desorbed and converted to nitrogen and ammonia, thereby regenerating adsorbent sites of the LNT 164.

The DPF 166 downstream of the LNT 164 is configured to capture other combustion byproducts within the exhaust not captured by the LNT 164. And, the DPF 166 itself may become clogged after extended operation such that the DPF also benefits from regeneration to extend useful life. Solid byproduct of diesel combustion, such as carbon particulates (e.g., "soot"), organic particulates, and sulfates, may accumulate over time in one or more portions DPF 166. Regeneration may occur by auto ignition of the particulate matter, which may occur in the presence of sufficient oxygen and high enough temperature. $NO_2$ released during LNT regeneration interacts with soot in the downstream DPF 166. Carbon and CO act as reductants to process the $NO_2$ during regeneration. $NO_2$ reacts with carbon trapped in the filter as it passes through the DPF 166. Thermal regeneration of the diesel particulate filter includes oxidation of the solid particulates to gaseous products, such as $CO_2$. $NO_x$-based regeneration can be conducted at lower temperatures than regeneration using purely oxygen. The upstream DOC 162 may be specifically configured to generate high levels of $NO_2$ which is held in the LNT 164 for a period until a regeneration purge to support lifetime operation of the DPF 166.

An exhaust temperature greater than normal operation (e.g., at least about 300-400 degrees C.) is needed to achieve sufficient $NO_2$ conversion by the DOC 162. However, the aftertreatment system 160 is far enough downstream from the combustion chambers 120 such that the exhaust temperature is lower than that required to cause oxidation at the DOC 162 or burn off soot at the DPF 166. Heat required for oxidation may be added as part of active regeneration. The exhaust gas temperature may be increased by a combination of engine management methods (e.g., exhaust gas recirculation optimization, intake throttling, post-injection of fuel, and other strategies). According to one example, the exhaust temperature may be increased to facilitate regeneration of one or more aftertreatment devices may be induced through post injection of additional fuel at the combustion chambers 120. The added fuel may remain unburned, and may ignite further downstream in the exhaust passage to further increase exhaust temperature. According to other examples, rich combustion is caused by retarded injection timing which includes changing the combustion timing so that fuel ignition happens later than a baseline specified time. According to further examples discussed in more detail below, additional fuel is added during a main fuel injection to cause engine output to overshoot a demanded engine output. The increased output corresponds with an increased exhaust temperature.

Figure 2:
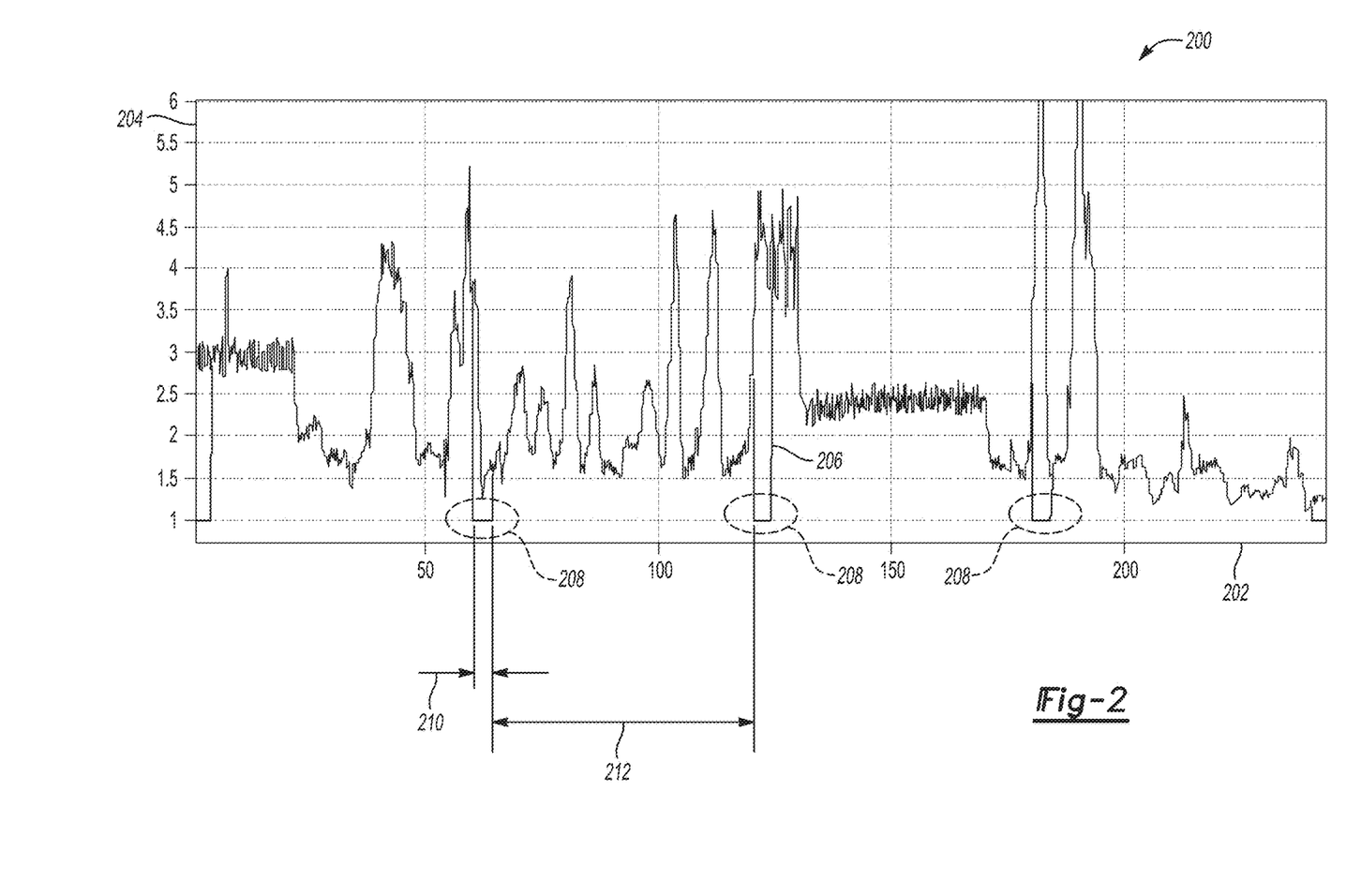
FIG. 2 is a plot of an engine air-fuel ratio over time including a plurality of exhaust aftertreatment regeneration events.

Referring to FIG. 2, plot 200 depicts air-fuel ratio over time for an engine which undergoes periodic regeneration processes. Horizontal axis 202 represents time in seconds and vertical axis 204 represents air-fuel equivalence ratio, $\lambda$. In the example provided, $\lambda$ is the ratio of actual air-fuel ratio to a stoichiometric air-fuel ratio for a given mixture. More specifically, a value of $\lambda=1.0$ corresponds to stoichiometric combustion, rich air-fuel mixtures correspond to $\lambda<1.0$, and lean air-fuel mixtures correspond to $\lambda>1.0$. Curve 206 represents a commanded $\lambda$ value to cause a plurality of regeneration events for the exhaust aftertreatment system. While the diesel combustion engine normally operates under lean operating conditions, periodic rich conditions are induced in order to cause regeneration (i.e., a $NO_x$ purge of the LNT). As discussed above, $NO_x$ is trapped in the LNT during lean operating conditions and then periodically purged. In the example of FIG. 2, a plurality of $NO_x$ purge events 208 are arranged to provide repeated regeneration cycles to support continuous operation of the exhaust aftertreatment system. Each $NO_x$ purge event 208 lasts for a period 210, or about 4 seconds for each one minute cycle 212. Approximately 1-2% excess fuel is expended during each short term regeneration event.

Figure 3A:
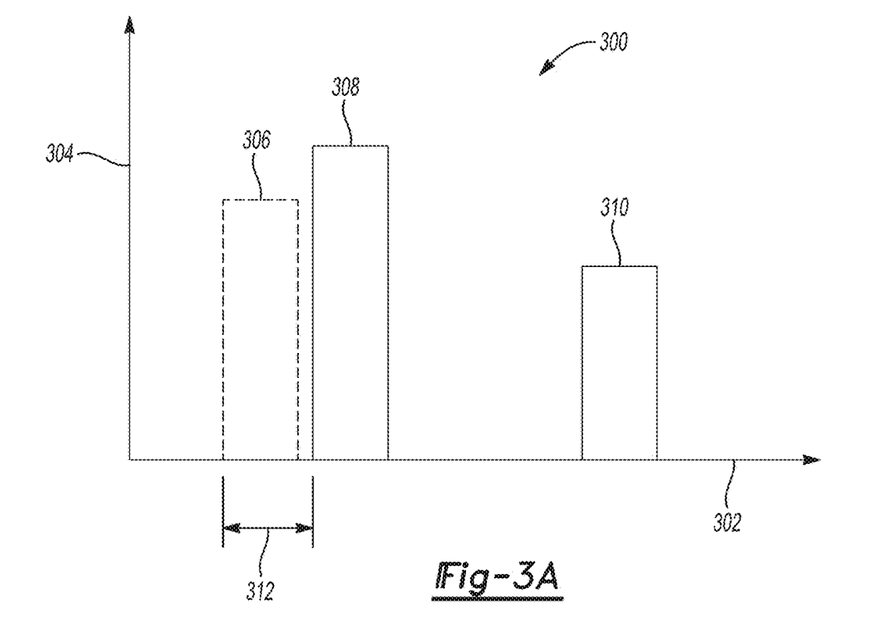
FIG. 3A is a plot of injection pulse timing and quantity for a first control strategy.
Figure 3B:
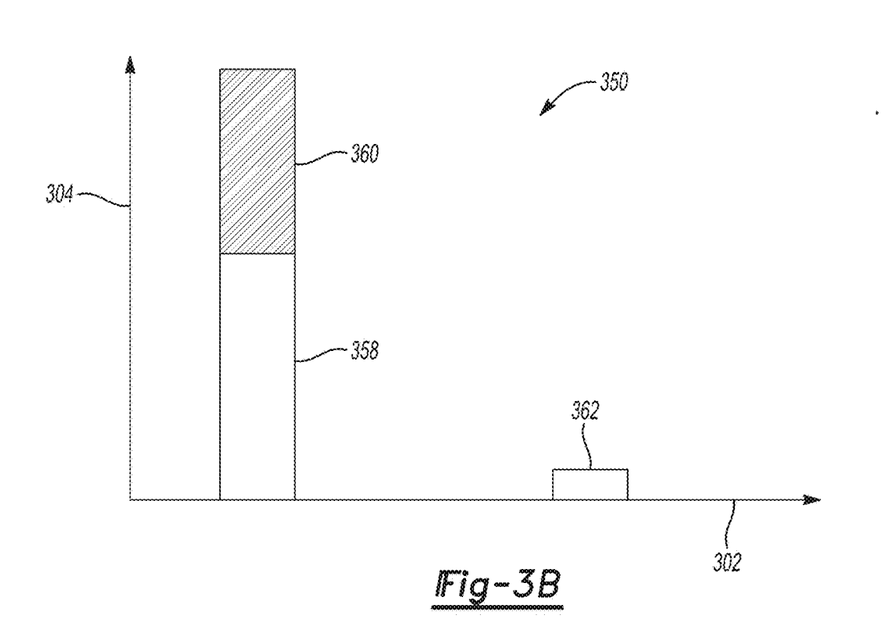
FIG. 3B is a plot of injection pulse timing and quantity for a second control strategy.

Referring to FIG. 3A and FIG. 3B, plots of example fuel injection pulse patterns during a regeneration event are depicted. With specific reference to FIG. 3A, a first aftertreatment regeneration strategy is reflected by plot 300. Horizontal axis 302 represents time and vertical axis 304 represents quantity of fuel injected by one or more fuel pulses. A baseline main fuel pulse 306 is adjusted to create a regeneration main pulse 308 which is increased in quantity and is delayed by a time duration 312 to retard combustion. Additionally, a post injection 310 provides additional fuel following combustion to further induce rich combustion conditions may cause unburned fuel to be present in the exhaust flow. The strategy represented by plot 300 may be applied to conventional diesel vehicles to provide regeneration to one or more aftertreatment devices as discussed above.

Referring to FIG. 3B, an alternate fuel pulse control strategy to support aftertreatment regeneration is represented by plot 350. Where a hybrid vehicle includes an electric machine as part of the propulsion system along with the combustion engine, advanced fuel pulse control may be coordinated with motor control to achieve improved efficiency during regeneration of one or more exhaust aftertreatment devices. A main fuel pulse 358 is increased during the main pulse timing to drive up engine output to overshoot a demanded engine output. A supplemental fuel quantity 360 is combined with the main fuel pulse 358 to increase engine output. The increased engine output drives up exhaust temperature to a sufficient level to purge $NO_2$ from the LNT and cause regeneration of the DPF. To counteract the increased output of the engine which is arranged to overshoot torque demanded by a driver, negative torque from the electric machine is applied to meter the overall propulsion system output torque to match the driver torque demand. By upshifting the load of the engine, several advantages are achieved. First, improved brake specific fuel consumption (BSFC) occurs due to running the engine closer to a high efficiency operating region, or "sweet spot," as compared to lower output ranges which are less fuel efficient. Second, applying the electric machine as a generator to recover energy passes charge current back to one or more batteries for storage and subsequent use for propulsion. Thus the fuel control strategy described herein improves overall fuel efficiency by recovering a portion of the energy from the regeneration added fuel.

Once an initial pulse (i.e., the combination of the main fuel pulse 358 and the supplemental pulse 360) is calculated to drive up engine output and the resistive torque from the electric machine is applied, a precise post injection fuel quantity 362 is refined based on the specific propulsion system output and the actual $\lambda$ value versus an initial target $\lambda$. As discussed in more detail below, data from a mass airflow (MAF) sensor signal may be used as one of multiple feedback signals to facilitate a more precise quantity of post injection fuel, when necessary, to support regeneration and closely match driver torque demands.

Figure 4:
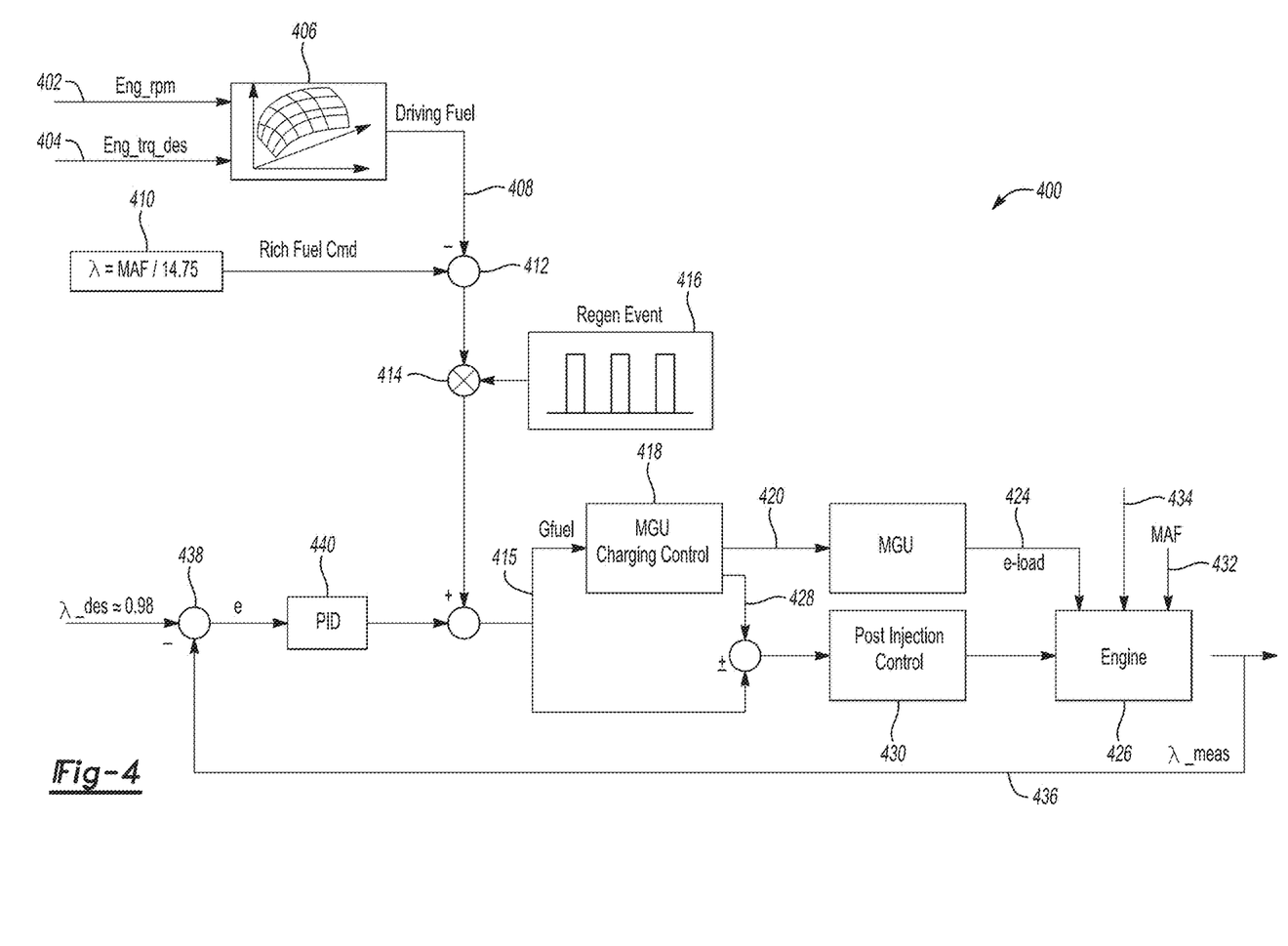
FIG. 4 is a control diagram for exhaust posttreatment regeneration.

Referring to FIG. 4, a control diagram 400 depicts an example strategy for providing optimized control of LNT $NO_2$ purge and regeneration. At 402, an engine rotational speed signal is provided, and at 404 desired engine torque is input to the regeneration algorithm. Each of the engine speed 402 and engine torque 404 are used to determine an expected driving fuel quantity 408 to be delivered to the engine.

According to the example of FIG. 4, a fuel map 406 is used to lookup fuel requirements according to the required engine speed and torque.

At 412 the algorithm includes taking a difference between the required driving fuel quantity 408 derived from an engine lookup table and a rich fuel command 410 in order to determine the amount of excess fuel to be added to the main fuel pulse in order to cause regeneration of the exhaust aftertreatment devices. The rich fuel command 410 corresponds to a combustion λ value of about 1 for regeneration. The rich fuel command 410 causes a total fuel injection amount to meet rich regeneration conditions.

416 is a time series binary signal that takes value 1 during expected LNT regeneration event, and 0 otherwise. The amount of excess fuel determined at 412 is multiplied by the binary signal 416 at 414, where an initial regeneration event is caused by the additional of a rough supplemental fuel quantity estimate 415 added to the main fuel pulse similar to the fuel pulse strategy discussed above in reference to FIG. 3B. More specifically, one or more scheduled fuel pulses 416 are provided to the engine to induce a rich combustion condition according to a predetermined regeneration cadence.

Figure 5:
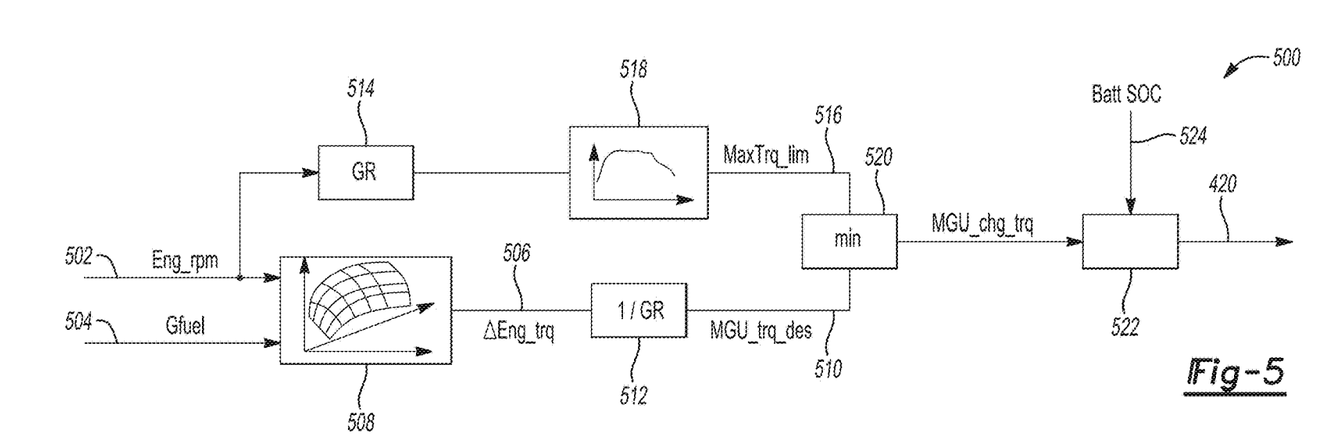
FIG. 5 is a control diagram for electric machine energy generation control.

Discussed in more detail with respect to FIG. 5, block 418 represents an electric machine regeneration charging control sub-algorithm that is used to determine the amount of energy able to be generated by the electric machine and passed to an energy storage device (e.g., a high voltage battery). Based on output of the charging control sub-algorithm 418, a generator activation command 420 is provided to the electric machine 422. Once the electric machine is activated as a generator, a torque load 424 is applied to the engine 426 to reduce the overall propulsion system output and recover energy from the increased output of the regeneration condition.

The electric machine regeneration charging control sub-algorithm 418 outputs data to provide a refinement of the air-fuel ratio by providing a post injection control command 428. Based on the amount of negative torque which the electric machine is determined to apply, an adequate post injection fuel amount 430 may be supplied to the engine 426 to achieve at targeted air-fuel ratio λ_des within a combustion chamber of the engine 426.

The MAF sensor is disposed near an intake port of the engine 426 to output an airflow signal 432 indicative of an amount of inlet air supplied to the engine. Similarly, a fuel supply sensor is disposed near a fuel supply line to output a fuel delivery signal 434 indicative of the actual amount of fuel delivered to the engine.

Based on the measured fuel delivery quantity and the air intake quantity, the algorithm includes providing a signal indicative of a measured actual air-fuel ratio λ_meas 436 present during combustion. The measured air-fuel ratio λ_meas 436 is fed back to an earlier portion of the algorithm 400 to serve as an input to further refine regenerative fuel command. At 438, a difference between the desired rich air-fuel ratio λ_des and the measured air-fuel ratio λ_meas 436 is taken as an error term e and fed into a proportional-integral-derivative (PID) portion 440 of the control algorithm to automatically adjust the initial rough supplemental fuel quantity estimate 415. PID control may be particularly well-suited for this task, as it is able to maintain low-error control without detailed information about other underlying fuel injection or aftertreatment dynamics. The PID feedback loop portion of the control algorithm is performed rapidly to provide real-time refinement of the desired air-fuel ratio λ_des. According to one example, the air-fuel ratio feedback adjustment occurs at a within a timeframe from about 6-25 milliseconds.

By actively adjusting the target rich air-fuel ratio and the electric machine regeneration limits the rich combustion condition may be induced while maximizing the power recovered, and at the same time minimizing the quantity of fuel supplied for post injection.

Referring to FIG. 5, an algorithm 500 for electric machine charging control is depicted, for example such as that discussed above in reference to charging control sub-algorithm 418. An engine speed 502 and the added generation fuel quantity 504 are each used as an inputs to determine a forecasted change in engine output torque ΔEng_trq 506. According to the example of FIG. 5, a lookup table 508 is used to determine engine output toque based on the engine speed 502 and regeneration fuel amount 504. A desired generation torque MGU_trq des 510 is calculated based on a gear ratio GR between the engine and the electric machine (e.g., motor torque interface 124 which mechanically couples the engine to the motor). In the example of FIG. 5 a transfer function 512 includes applying a gear ratio inverse 1/GR to convert the excess engine torque to regeneration torque. Generally the desired electric machine generation torque may be based on matching an increase in engine torque corresponding to a difference caused by the added fuel.

There may be a physical limit on how much torque the electric machine is capable of accepting. Engine speed 502 is converted to an electric machine speed. Transfer function 514 calculates an input speed to the electric machine based on at least the gear ratio GR between the engine and the electric machine. Depending on characteristics of the electric machine, a maximum resistive torque from generation MaxTrq_lim 516 may be achievable as a function of rotational speed. In some examples, a maximum torque limit curve 518 is stored at the controller and is sued to determine MaxTrq_lim 516 based on the motor speed.

At 520 the electric machine desired generation torque MGU_trq des 510 needed to account for the excess fuel supplied is compared to the torque limit MaxTrq_lim 516 related to the capability of the electric machine. The minimum of desired torque value and the generator torque limit is used to determine a final generator command for the electric machine.

At 522 a SOC of the battery 524 is considered to avoid overcharging. In one example, no generation is applied when the SOC is greater than a charging threshold relative to a full charge (e.g., >70% SOC). In other examples, a reducing function may applied to electric machine generation controls at 522 based on the battery having sufficient charge to pass less than the full capability of the electric machine and/or desired generation corresponding to the rough supplemental fuel quantity estimate 415. A final generator command 420 for the generator is output from the power adjustment portion 522 and passed as the electric machine command to activate it as a generator.

Figure 6:
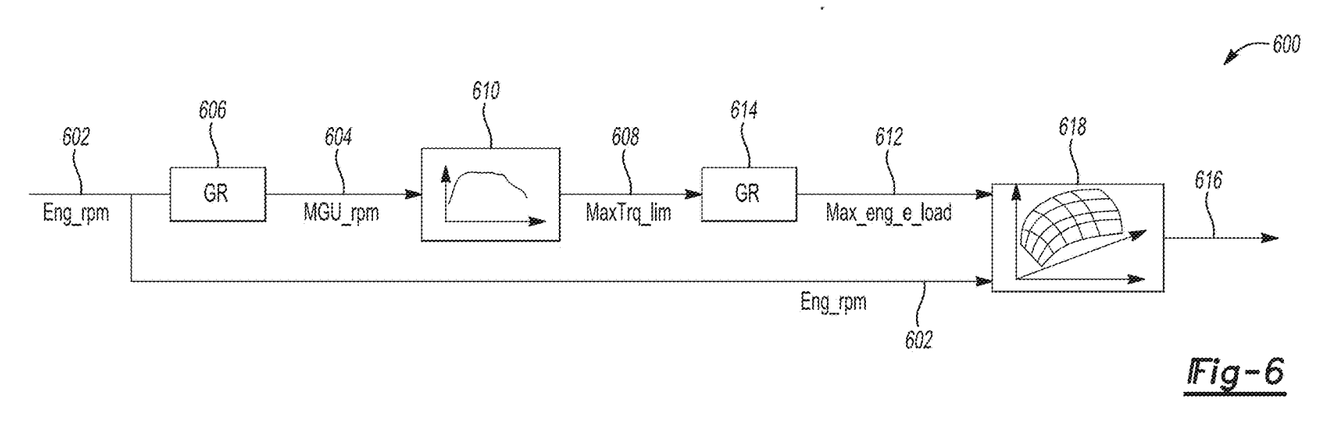
FIG. 6 is a control diagram for determining post injection fuel quantity.

Referring to FIG. 6, algorithm 600 provides a feedback value to adjust the fuel quantity supplied to the engine for regeneration. As discussed above, a post injection control command is provided to adjust the rough supplemental fuel quantity estimate 415 by supplying a precise amount of additional fuel to adjust the air-fuel ratio to the desired rich combustion condition. The quantity of post injection fuel may be modified to coincide with particular generation capability of the electric machine. Engine output speed 602 is input to the fuel charging limit algorithm 600. Similar to the discussion above, the electric machine input speed 604 is determined from transfer function 606 which relies on gear ratio GR between the engine and the electric machine. Depending on characteristics of the electric machine, a maximum resistive torque from generation MaxTrq_lim 608 may be achievable as a function of rotational speed. In some examples, a maximum torque limit curve 610 is stored at the controller and is used to determine MaxTrq_lim 608 based on the relectric machine speed. The max torque limit to be applied by the electric machine is then translated back to an engine load limit Max_eng_e_load 612. Similar to other translations discussed herein, Max_eng_e_load 612 may be determined using a transfer function 614 which relies on gear ratio GR between the engine and the electric machine.

Each of Max_eng_e_load 612 and engine output speed 602 is supplied to a portion of the algorithm to output the appropriate fuel command 616 (e.g., which may operate as post injection control command 428 discussed above). Fuel command 616 serves to supplement a main fuel pulse to meter the degree of engine output which overshoots driver torque demand to be absorbed by the electric machine. According to some examples, a lookup table 618 is stored at the controller and is used to determine the appropriate fuel command 616.

Figure 7:
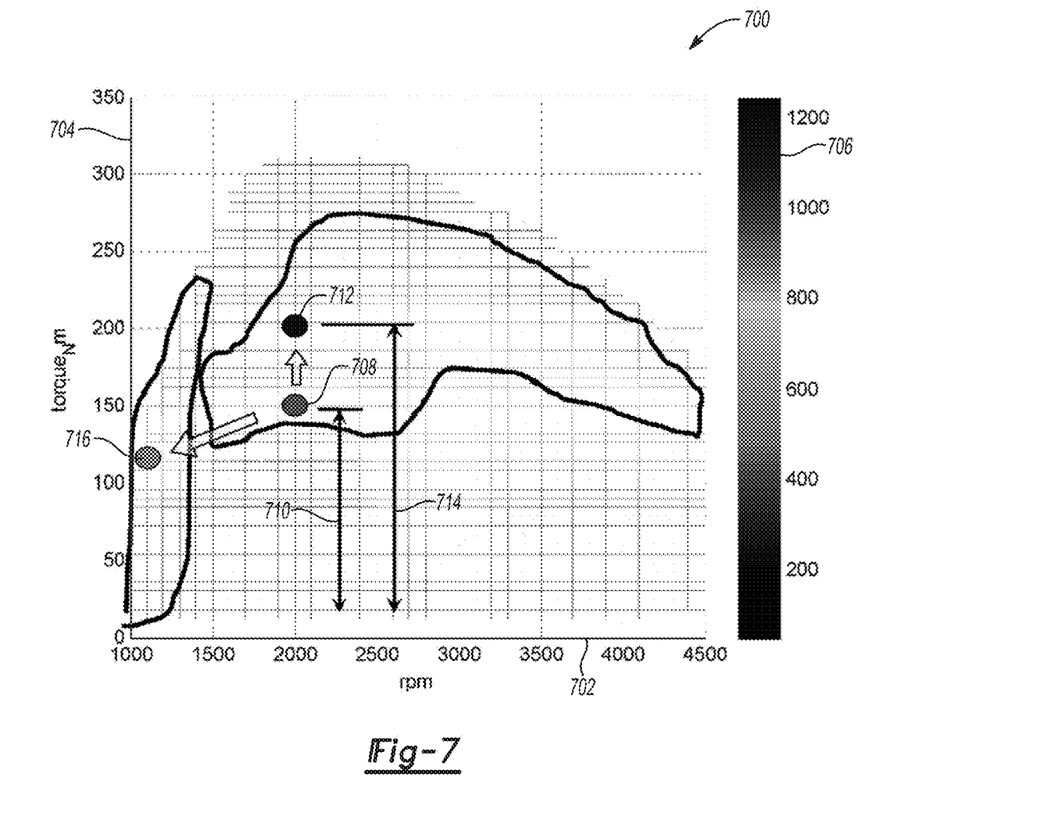
FIG. 7 is a plot of $NO_x$ emissions versus engine speed and torque output.

Referring to FIG. 7, plot 700 depicts an engine operating map and illustrates certain operating conditions according to aspects of the present disclosure. Horizontal axis 702 represents engine rotational speed, and vertical axis 704 represents engine output torque. Gradient scale 706 represents a concentration of $NO_x$ in parts per million (ppm). Each of the lean and rich operating conditions above may reside in different regions of the operating map. For example, the engine may operate at a first region 708 under normal conditions when the engine provides a first torque output 710 according to a driver torque demand (e.g., engine outputs about 175 N-m of torque at about 2500 rpm). As discussed above, this condition may correspond to lean air-fuel ratio combustion and $NO_x$ generated during combustion is accumulated within the aftertreatment system.

As discussed above, the engine may change operation according to a propulsion system control strategy to cause regeneration of the aftertreatment system. Engine output is increased to second region 712 to increase engine output to a second torque output 714. At the same time the electric machine is operated as a generator and applies a resistive torque to the engine such that the engine output speed remains commensurate with driver demand (e.g., engine outputs about 200 N-m of torque at about 2,000 rpm). In this region the $NO_x$ output is increased to about 1,000 ppm along with an increase in exhaust temperature to force a purge of the exhaust aftertreatment system as discussed above. After a predetermined regeneration period the engine may return to lean operation and normal combustion conditions such as at first region 706. While the example of FIG. 7 depicts regeneration of the exhaust aftertreatment system at a moderate engine load of around 200 N-m, it should be appreciated that such regeneration may also be performed at lower engine loads. The propulsion system control strategy includes periodically switching between the lean operating condition of first region 708 and the rich operating condition of second region 712. Energy recovered by the electric machine during the regeneration cycle is stored at a battery or other energy storage source for subsequent use in powering vehicle propulsion.

In another example, the engine output is decreased to an idle state corresponding to a third region 716 (e.g., engine outputs about 110 N-m at about 1100 rpm). The motor-assist mode allows $NO_x$ output to be significantly reduced (e.g., around 600 ppm) while the vehicle is being propelled using stored electrical energy. Extended periods of operation using motor-assist may also help to extend lean operating conditions such as at first region 708 by slowing the rate at which the aftertreatment system becomes saturated with $NO_x$ or other combustion byproducts.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle propulsion system comprising:
   a diesel internal combustion engine configured to output a primary output torque;
   at least one fuel injector arranged to supply fuel to a combustion chamber of the engine;
   an electric machine coupled to the engine to exchange torque;
   at least one exhaust aftertreatment device to capture combustion byproducts within an exhaust flow; and
   a controller programmed to
      control the at least one fuel injector to supply a baseline fuel injection corresponding to a first engine output to satisfy a driver torque demand,
      control the at least one fuel injector to periodically supplement the baseline target fuel injection quantity to increase engine output torque to overshoot the first engine output thereby increasing combustion byproducts to regenerate the at least one exhaust aftertreatment device, and control the electric machine to apply a resistive torque from the electric machine such that an overall propulsion system torque remains substantially at the driver torque demand.

2. The vehicle propulsion system of claim 1 wherein periodically supplementing the baseline target fuel injection quantity includes providing, via the at least one fuel injector, at least one post-combustion fuel injection.

3. The vehicle propulsion system of claim 1 wherein periodically supplementing the baseline target fuel injection quantity includes increasing a quantity of the baseline fuel injection.

4. The vehicle propulsion system of claim 1 wherein a fuel quantity associated with periodically supplementing the baseline target fuel injection is sized based on a comparison of a target regeneration air-fuel ratio against a measured, via a sensor, combustion air fuel ratio.

5. The vehicle propulsion system of claim 1 wherein the resistive torque from the electric machine is based on an electric machine maximum generator power limit.

6. The vehicle propulsion system of claim 1 wherein the resistive torque from the electric machine is limited based on a battery charge relative to a state of charge threshold.

7. The vehicle propulsion system of claim 1 wherein the resistive torque from the electric machine is based on matching an increase in engine torque resulting from supplementing the baseline fuel injection.

8. The vehicle propulsion system of claim 1 wherein the controller is further programmed to activate the electric machine to provide a supplemental torque to assist the engine and reduce engine output during non-regeneration periods.

9. The vehicle propulsion system of claim 1 wherein the at least one exhaust aftertreatment device includes at least one of a diesel oxidation catalyst, a lean $NO_x$ trap, and a diesel particulate filter.

10. The vehicle propulsion system of claim 9 wherein increasing combustion byproducts includes causing a flush of $NO_x$ particles of the lean $NO_x$ trap to react with particulates accumulated at the diesel particulate filter to regenerate the diesel particulate filter.

11. A method of regenerating at least one exhaust aftertreatment device of a propulsion system having an engine and an electric machine, the method comprising:

supplying a baseline fuel injection, via at least one fuel injector, corresponding to a first engine output corresponding to a driver torque demand;

increasing the baseline fuel injection, via the at least one fuel injector, to cause a second engine output in excess of the first engine output;

controlling application of a resistive torque from the electric machine such that an overall propulsion system output is maintained substantially at the driver torque demand;

comparing, via the controller, a measured, via a sensor, air-fuel ratio to a regeneration desired air-fuel ratio; and supplying a post-combustion fuel injection, via the at least one fuel injector, based on an error from the desired air-fuel ratio to cause a third engine output, wherein at least one of the second engine output and the third engine output causes regeneration of the at least one aftertreatment device.

12. The method of claim 11 wherein the resistive torque from the electric machine is based on at least one of an electric machine maximum generator power limit and a battery charge relative to a state of charge threshold.

13. The method of claim 11 wherein the resistive torque from the electric machine is based on matching an increase in engine torque corresponding to a difference between the second engine output and the first engine output.

14. The method of claim 11 further comprising operating the electric machine as a motor to provide a supplemental torque during non-regenerating periods.

15. The method of claim 11 wherein the at least one exhaust aftertreatment device include a lean $NO_x$ trap, and at least one of the second engine output and the third engine output corresponds to rich exhaust conditions that cause a flush of $NO_x$ particles from the lean $NO_x$ trap.

16. A vehicle propulsion system comprising:

an internal combustion engine configured to output a primary output torque;

at least one fuel injector arranged to supply fuel to a combustion chamber of the engine;

an electric machine coupled to the engine to exchange torque;

at least one exhaust aftertreatment device to capture combustion byproducts within an exhaust flow; and a controller programmed to supply a baseline fuel injection, via the at least one fuel injector, corresponding to a first engine output to satisfy a driver torque demand, periodically increase the baseline target fuel injection quantity, via the at least one fuel injector, to increase engine output torque to a second engine output thereby increasing combustion byproducts to regenerate the at least one exhaust aftertreatment device, apply a resistive torque from the electric machine based on at least one of an electric machine maximum generator power limit and a battery charge relative to a state of charge threshold, and in response to an exhaust air-fuel ratio, measured via a sensor, corresponding to the second engine output being greater than a target ratio, supply a post-combustion fuel injection, via the at least one fuel injector, into the exhaust.

17. The vehicle propulsion system claim 16 wherein a fuel quantity associated with periodically increasing the baseline target fuel injection is sized based on a comparison of a target regeneration air-fuel ratio against the measured combustion air fuel ratio.

18. The vehicle propulsion system claim 16 wherein the at least one exhaust aftertreatment device include a lean $NO_x$ trap, and the second engine output corresponds to rich exhaust conditions that cause a flush of $NO_x$ particles from the lean $NO_x$ trap.

19. The vehicle propulsion system claim 16 wherein the controller is further programmed to activate the electric machine to provide a supplemental torque to assist the engine and reduce engine output during non-regeneration periods.

\* \* \* \* \*